United States Patent
Kemp

(10) Patent No.: US 7,818,099 B2
(45) Date of Patent: Oct. 19, 2010

(54) SYSTEM AND METHOD FOR ALERTING A USER OF AN AIRCRAFT OF A POSSIBLE ENTRANCE INTO A SELECTED AIRSPACE

(75) Inventor: Lance A. Kemp, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1091 days.

(21) Appl. No.: 11/509,118

(22) Filed: Aug. 24, 2006

(65) Prior Publication Data

US 2008/0051947 A1 Feb. 28, 2008

(51) Int. Cl.
*G06F 17/00* (2006.01)
(52) U.S. Cl. .......................... 701/3; 340/945
(58) Field of Classification Search ............. 701/3, 701/14; 340/945, 961, 963–965; 73/178 R; 342/29, 36
See application file for complete search history.

(56) References Cited

U.S. PATENT DOCUMENTS

| | | | |
|---|---|---|---|
| 5,095,746 A * | 3/1992 | Stanis | ............... 73/178 R |
| 6,380,869 B1 | 4/2002 | Simon et al. | |
| 6,571,155 B2 * | 5/2003 | Carriker et al. | ............... 701/3 |
| 6,675,076 B1 * | 1/2004 | Moody | ............... 701/11 |
| 6,675,095 B1 * | 1/2004 | Bird et al. | ............... 701/301 |
| 6,690,299 B1 | 2/2004 | Suiter | |
| 6,700,482 B2 | 3/2004 | Ververs et al. | |
| 6,885,313 B2 | 4/2005 | Selk, II et al. | |
| 7,127,334 B2 * | 10/2006 | Frink | ............... 701/3 |
| 2002/0173888 A1 | 11/2002 | Shelton et al. | |
| 2003/0033084 A1 | 2/2003 | Corcoran, III | |
| 2003/0169185 A1 | 9/2003 | Taylor | |
| 2005/0200501 A1 | 9/2005 | Smith | |
| 2006/0038720 A1 | 2/2006 | Poe | |

* cited by examiner

*Primary Examiner*—Yonel Beaulieu
(74) *Attorney, Agent, or Firm*—Ingrassia Fisher & Lorenz, P.C.

(57) ABSTRACT

A system and method for an aircraft alerts a user of the aircraft of a possible entrance into a selected airspace. A flight path of an aircraft and locations of a plurality of selected airspaces are stored on at least one storage medium. A processor is in operable communication with the at least one storage device and configured to compare the flight path of the aircraft to the locations of the plurality of selected airspaces and provide an alert signal if the flight path calls for the aircraft to operate within a pre-selected distance of at least one of the plurality of selected airspaces.

12 Claims, 9 Drawing Sheets

SYSTEM AND METHOD FOR ALERTING A USER OF AN AIRCRAFT OF A POSSIBLE ENTRANCE INTO A SELECTED AIRSPACE

TECHNICAL FIELD

The present invention relates to an avionics system, and more particularly, to a system and method for alerting a user of an aircraft of a possible entrance into a selected airspace.

BACKGROUND

Many modern vehicles, such as aircraft, are equipped with a wide variety of electrical and computing systems that monitor and, in some instances, control various operational aspects of the aircraft. One of the tasks performed by these systems is to warn a user (e.g., pilot) of the aircraft that the aircraft is approaching a particular type of airspace, such as a noise-restriction airspace or a no-fly zone.

Such warning systems typically incorporate positioning systems, such as the Global Position System (GPS), along with a determined heading of the aircraft (e.g., via a compass and an Automatic Direction Finder (ADF)), and a database, either onboard the aircraft or on the ground, of the various restricted airspaces to compare the position and heading of the aircraft to the locations of the airspaces. A notification or alarm is given to the user if the current position is within a predetermined distance of one of the airspaces or the current position and heading of the aircraft indicate that the aircraft will intrude upon a restricted airspace within a predetermined amount of time.

However, because such warnings are only given while the aircraft is in flight and on a heading to intrude upon the airspace, changes to the flight path are made while the aircraft is in flight, which can add to the difficulty and increase the stress of operating an aircraft. Additionally, such in-flight changes to the flight path may result in an increase in the amount of fuel required to complete the flight.

Accordingly, it is desirable to provide a system and method for alerting a user of an aircraft of a possible intrusion into an airspace that reduces the number of in-flight changes to the flight path due to restricted airspaces. In addition, it is desirable to provide such a system that can provide such alerts by compensating for the actual position of the aircraft compared to the planned flight path. Furthermore, other desirable features and characteristics of the present invention will become apparent from the subsequent detailed description and the appended claims, taken in conjunction with the accompanying drawings and the foregoing technical field and background.

BRIEF SUMMARY

An avionics system is provided. A flight path of an aircraft and locations of a plurality of selected airspaces are stored on at least one storage medium. A processor is in operable communication with the at least one storage device and configured to compare the flight path of the aircraft to the locations of the plurality of selected airspaces and provide an alert signal if the flight path calls for the aircraft to operate within a pre-selected distance of at least one of the plurality of selected airspaces.

A method for alerting a user of an aircraft of a possible entrance into a selected airspace is provided. A flight path is loaded onto a Flight Management System (FMS) onboard the aircraft. The flight path is compared to locations of a plurality of selected airspaces stored on a computer-readable medium in operable communication with the FMS. The user of the aircraft is alerted if the flight path calls for the aircraft to intersect one or more of the plurality of selected airspaces.

BRIEF DESCRIPTION OF THE DRAWINGS

The present invention will hereinafter be described in conjunction with the appended drawing figures, wherein like numerals denote like elements, and in which.

DETAILED DESCRIPTION

Figure 1:
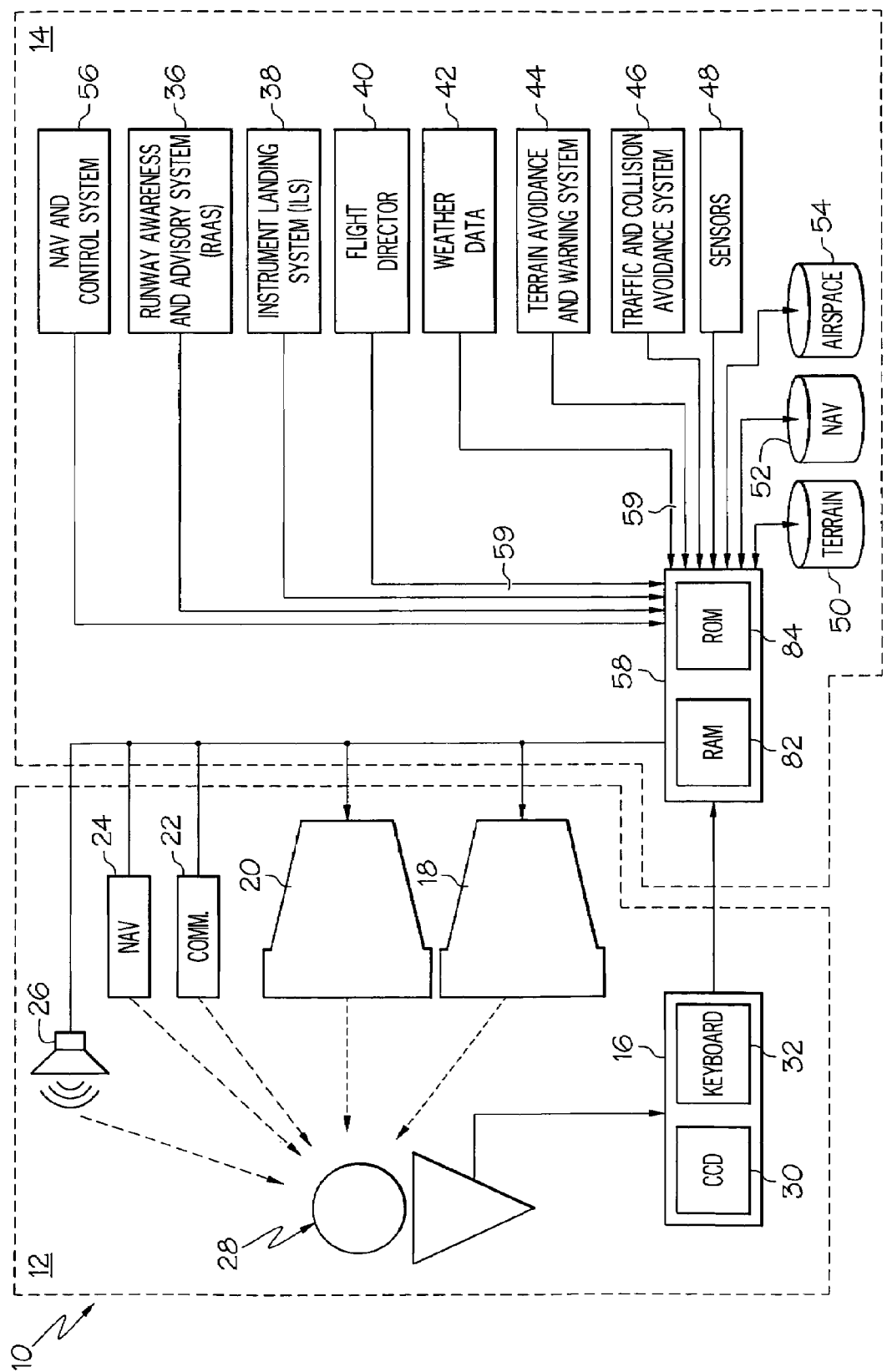
FIG. 1 is a block diagram schematically illustrating a vehicle including a flight deck and an avionics/flight system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

FIG. 1 to FIG. 10 illustrate an aviation system and/or method for alerting a user of an aircraft of a possible entrance into an airspace, such as a restricted airspace. A flight path is loaded into a flight management device, such as a Flight Management Device (FMS) onboard the aircraft. The flight path is compared to the locations of restricted airspaces stored in a storage device (or medium) which may be onboard the aircraft. If the flight path intrudes upon or enters, or calls for the aircraft to enter, an airspace (or in one embodiment comes within a pre-determined distance of a particular type of airspace), the user of the aircraft is provided with an indication of the possible intrusion. The indication may be visual and/or audible and be displayed or emanated on the flight deck of the aircraft.

FIG. 1 schematically illustrates a vehicle 10, such as an aircraft, according to one embodiment of the present invention. The vehicle 10 may be, in one embodiment, any one of a number of different types of aircraft such as, for example, a private propeller or jet engine driven airplane, a commercial jet liner, or a helicopter. In the depicted embodiment, the vehicle 10 includes a flight deck 12 (or cockpit) and an avionics/flight system 14. Although not specifically illustrated, it should be understood that the vehicle 10 also includes a frame or body to which the flight deck 12 and the avionics/flight system 14 are connected, as is commonly understood. It should also be noted that vehicle 10 is merely exemplary and could be implemented without one or more of the depicted components, systems, and data sources. It will additionally be appreciated that the vehicle 10 could be implemented with one or more additional components, systems, or data sources.

In one embodiment, the flight deck 12 includes a user interface 16, a plurality of display devices 18 and 20, a communications radio 22, a navigational radio 24, and an audio device 26. The user interface 16 is configured to receive input from a user 28 (e.g., a pilot) and, in response to the user input, supply command signals to the avionics/flight system 14. The user interface 16 may be any one, or combination, of various known user interface devices including, but not limited to, a cursor control device (CCD) 30, such as a mouse, a trackball, or joystick, and/or a keyboard, one or more buttons, switches, or knobs. In the depicted embodiment, the user interface 16 includes a CCD 30 and a keyboard 32. The user 28 uses the CCD 30 to, among other things, move a cursor symbol on the display screen, and may use the keyboard 32 to, among other things, input textual data.

Still referring to FIG. 1, the display devices 18 and 20 are each used to display various images and data, in graphic, iconic, and/or textual formats, and to supply visual feedback to the user 28 in response to user input commands supplied by the user 28 to the user interface 16. It will be appreciated that the display devices 18 and 20 may each be implemented using any one of numerous known displays suitable for rendering image and/or text data in a format viewable by the user 28, such as a cathode ray tube (CRT) displays, a LCD (liquid crystal display), a TFT (thin film transistor) displays, or a heads up display (HUD) projection.

The communication radio 22 is used, as is commonly understood, to communicate with entities outside the vehicle 10, such as air-traffic controllers and pilots of other aircraft. Although not illustrated, the communications radio 22 may include a microphone and speaker, such as on a headset which the user 28 operates to receive and send vocal messages. The navigational radio 24 is used to receive from outside sources and communicate to the user various types of information regarding the location of the vehicle, such as Global Positioning Satellite (GPS) system and Automatic Direction Finder (ADF) (as described below).

The audio device 26 is, in one embodiment, an audio speaker mounted within the flight deck 12. As shown, the audio device 26 is, in one embodiment, separated from the communications radio 22 and the navigational radio 24, and thus provides an audio indication, or signal, separate from any information or messages being transmitted to the user via the communications radio 22 and/or the navigational radio 24. In another embodiment, the audio device 26 is a headset, similar to the headset used with the communications radio 22.

The avionics/flight system 14 includes a runway awareness and advisory system (RAAS) 36, an instrument landing system (ILS) 38, a flight director 40, a weather data source 42, a terrain avoidance warning system (TAWS) 44, a traffic and collision avoidance system (TCAS) 46, a plurality of sensors 48, one or more terrain databases 50, one or more navigation databases 52, one or more airspace databases 54, a navigation and control system 56, and a processor 58. The various components of the avionics/flight system 14 are in operable communication via a data bus 59 (or avionics bus).

The RAAS 36 provides improved situational awareness to help lower the probability of runway incursions by providing timely aural advisories to the flight crew during taxi, takeoff, final approach, landing and rollout. The ILS 38 is a radio navigation system that provides aircraft with horizontal and vertical guidance just before and during landing and, at certain fixed points, indicates the distance to the reference point of landing. The flight director 40, as is generally known, supplies command data representative of commands for piloting the aircraft in response to flight crew entered data, or various inertial and avionics data received from external systems. The weather data source 42 provides data representative of at least the location and type of various weather cells. The TAWS 44 supplies data representative of the location of terrain that may be a threat to the aircraft, and the TCAS 46 supplies data representative of other aircraft in the vicinity, which may include, for example, speed, direction, altitude, and altitude trend. Although not illustrated, the sensors 48 may include, for example, a barometric pressure sensor, a thermometer, and a wind speed sensor.

The terrain databases 50 include various types of data representative of the terrain over which the aircraft may fly, and the navigation databases 52 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information.

The airspace databases 54 include various types of data representative of the locations, sizes, and shapes of various restricted use airspaces, such as the longitude and latitude of the borders of the airspaces and the altitude profile (if applicable) of the airspaces. The restricted use airspaces for which the airspace databases 54 have stored may include, for example, Flight Information Regions (FIR), Upper Flight Information Regions (UIR), Military Operating Areas (MOA), Flight Area Restrictions (FAR), and Special Use Airspaces (SUA).

Figure 2:
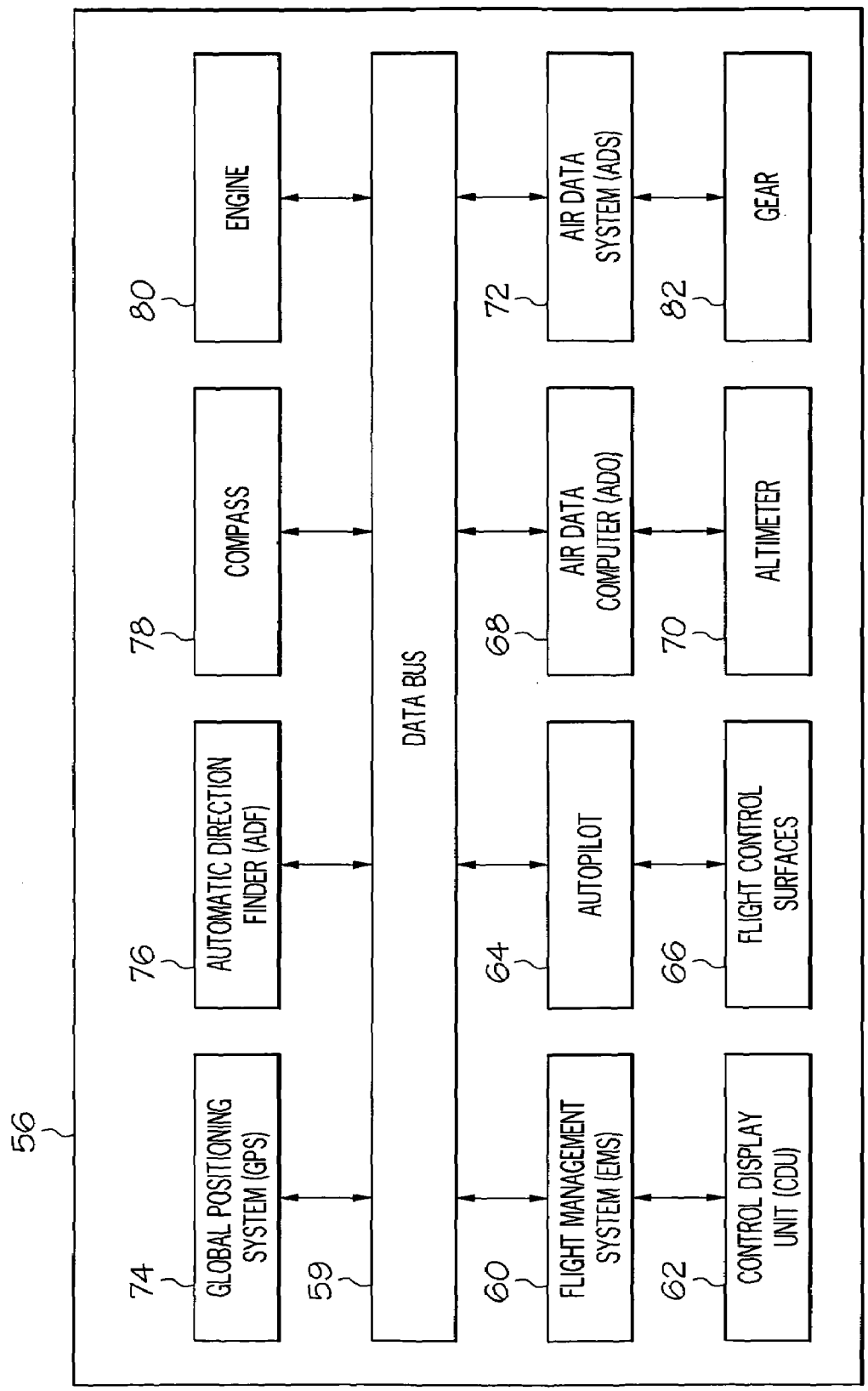
FIG. 2 is a block diagram of a navigation and control subsystem within the avionics/flight system illustrated in FIG. 1.

As illustrated in FIG. 2, the navigation and control system 56 includes a flight management system (FMS) 60, a control display unit (CDU) 62, an autopilot or automated guidance system 64, multiple flight control surfaces 66 (e.g., ailerons, elevators, and a rudder), an Air Data Computer (ADC) 68, an altimeter 70, an Air Data System (ADS) 72, a Global Positioning Satellite (GPS) system 74, an automatic direction (ADF) 76, a compass 78, at least one engine 80, and gear (i.e., landing gear) 82.

Figure 3:
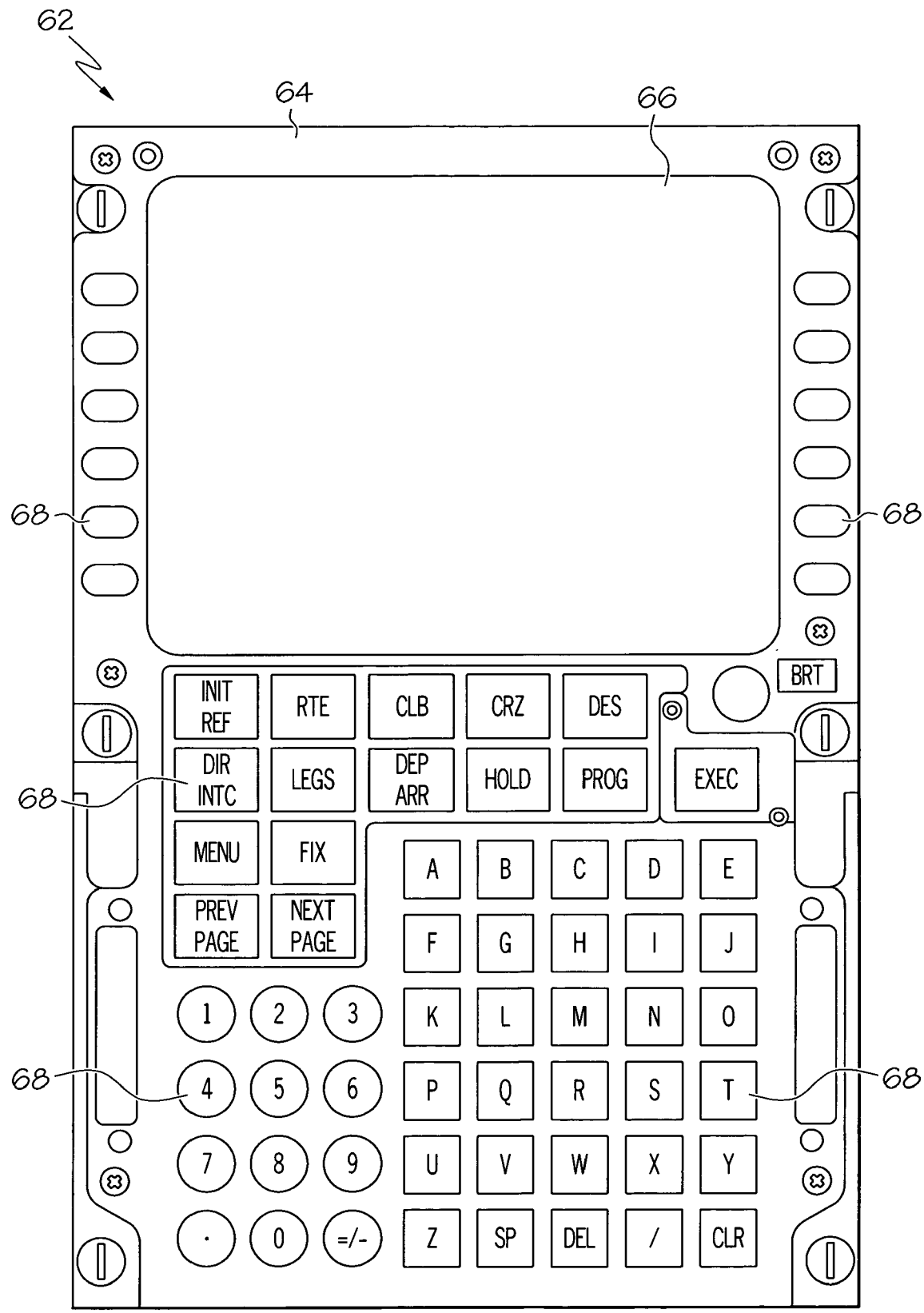
FIG. 3 is a top view of a control display unit, including a display screen, within the navigation and control subsystem of FIG. 2.

The FMS 60, in one embodiment, is a computerized avionics component that is used to assist the pilot, or pilots, in navigating and managing the vehicle 10 by utilizing various other components of the navigation and control system 56, such as the CDU 62 and the autopilot 64 shown in FIG. 2, as well as the avionics system 14 shown in FIG. 1. FIG. 3 illustrates an exemplary embodiment of the CDU 62 in greater detail. In the depicted embodiment, the CDU includes a housing 64, along with a multi-function display 66 (e.g., an LCD display) for displaying various types of information (text and/or images) to the user 28 and multiple user input devices 68 (e.g., an alpha-numeric keypad, buttons, switches, knobs, etc.) connected to the housing 64. Although not illustrated as such, the CDU 12 may be located on the flight deck 12 of the vehicle 10 and be integrated with the user interface 16 and the display devices 18 and 20. Additionally, the user 28 may enter, or define, one or more user-defined airspaces via the user input devices 68, which are then stored, for example, in the airspace databases 54. An example of such a user-defined airspace may be airspaces over particular types of terrain, such as mountains or bodies of water, over which the user does not wish to fly, for any of numerous possible reasons.

Although not shown in FIG. 2, the ADS 72 may include a pitostatic tube system, as is commonly understood in the art. The navigation and control system 56 may also incorporate the data bus 59, through which the various components of the navigation and control system 56, as well as the entire vehicle 10, may be in operable communication. It should be understood that the vehicle 10 shown in FIGS. 1 and 2 is merely of an example of an embodiment of the invention. As such, the vehicle 10 may include other components, system, and subsystems, as will be appreciated by one skilled in the art, such as military devices, such as weapons and targeting systems, and additional systems, such as a Ram Air Turbine (RAT) system.

Referring now to FIG. 1, the processor 56 may be any one of numerous known general-purpose microprocessors or an application specific processor that operates in response to program instructions. In the depicted embodiment, the processor 56 includes on-board RAM (random access memory) 82, and on-board ROM (read only memory) 84. The program instructions that control the processor 58 may be stored in either or both the RAM 82 and the ROM 84. For example, the operating system software may be stored in the ROM 84, whereas various operating mode software routines and various operational parameters may be stored in the RAM 82. It will be appreciated that this is merely exemplary of one scheme for storing operating system software and software routines, and that various other storage schemes may be implemented. It will also be appreciated that the processor 58 may be implemented using various other circuits, not just a programmable processor. For example, digital logic circuits and analog signal processing circuits could also be used.

Figure 4:
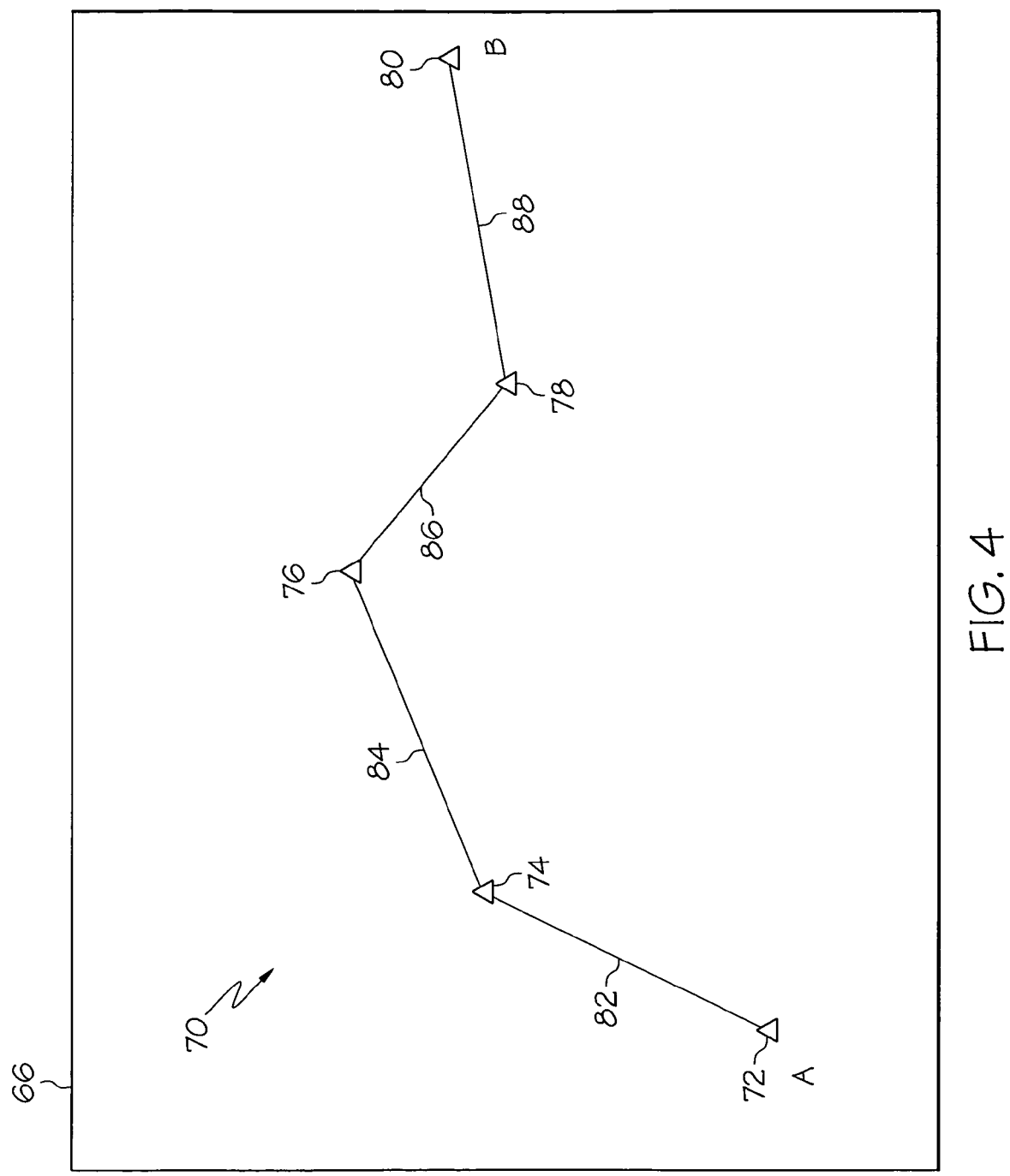
FIG. 4 is a top view of the display screen of FIG. 3 with a flight path displayed thereon.

During operation, referring to FIGS. 3 and 4, a user inputs or loads a flight plan, or flight path, into the FMS 60 via the user input devices 68 on the CDU 62. In one embodiment, the flight path is displayed on the multi-function display 66 of the CDU after being entered. Referring specifically to FIG. 4, which illustrates a flight path 70 as displayed on the multi-function display 66 of the CDU 62, the flight path 70 includes an origination point A and a destination point B interconnected by multiple waypoints 72-80 and segments (or legs) 82-88.

As will be appreciated by one skilled in the art, the origination point (or origin) A and the destination point (or destination) B, along with the corresponding waypoints 72 and 80, may represent the locale (e.g., a city), or more specifically an airfield or airport located near a locale, from which the vehicle 10 is to begin a flight (i.e., take-off) and end the flight (i.e., land), respectively. The remaining waypoints 74, 76, and 78 may represent the known locations (e.g., latitude and longitude) of various navigational markers which may be stored in the navigation database 52 shown in FIG. 1. Examples of waypoints 74-78 include other locales (or airports), landmarks, and navigation beacons, such as ADF beacons. The segments 82-88 may represent a bearing, or aircraft heading, between successive waypoints 72-80 of the flight path 72. The flight path 70 thus represents a planned route, including latitudes and longitudes, as well as headings, between the origin A and the destination B, as the vehicle 10 travels from one waypoint 72-80 to the next, eventually arriving at the destination B. Although not shown, the flight path 70 may also include an altitude profile that describes a planned altitude at which the vehicle 10 is to fly along the various segments 82-88 of the flight path 70, as well as a speed profile that describes a planned speed for each portion of the flight. As will be appreciated by one skilled in the art, FIGS. 4-7 show the flight path 70 with the FMS 60 and/or CDU 62 in a "plan" mode, in which the waypoints 72-80 are stationary on the display 66, regardless of the heading of the vehicle 10.

Figure 5:
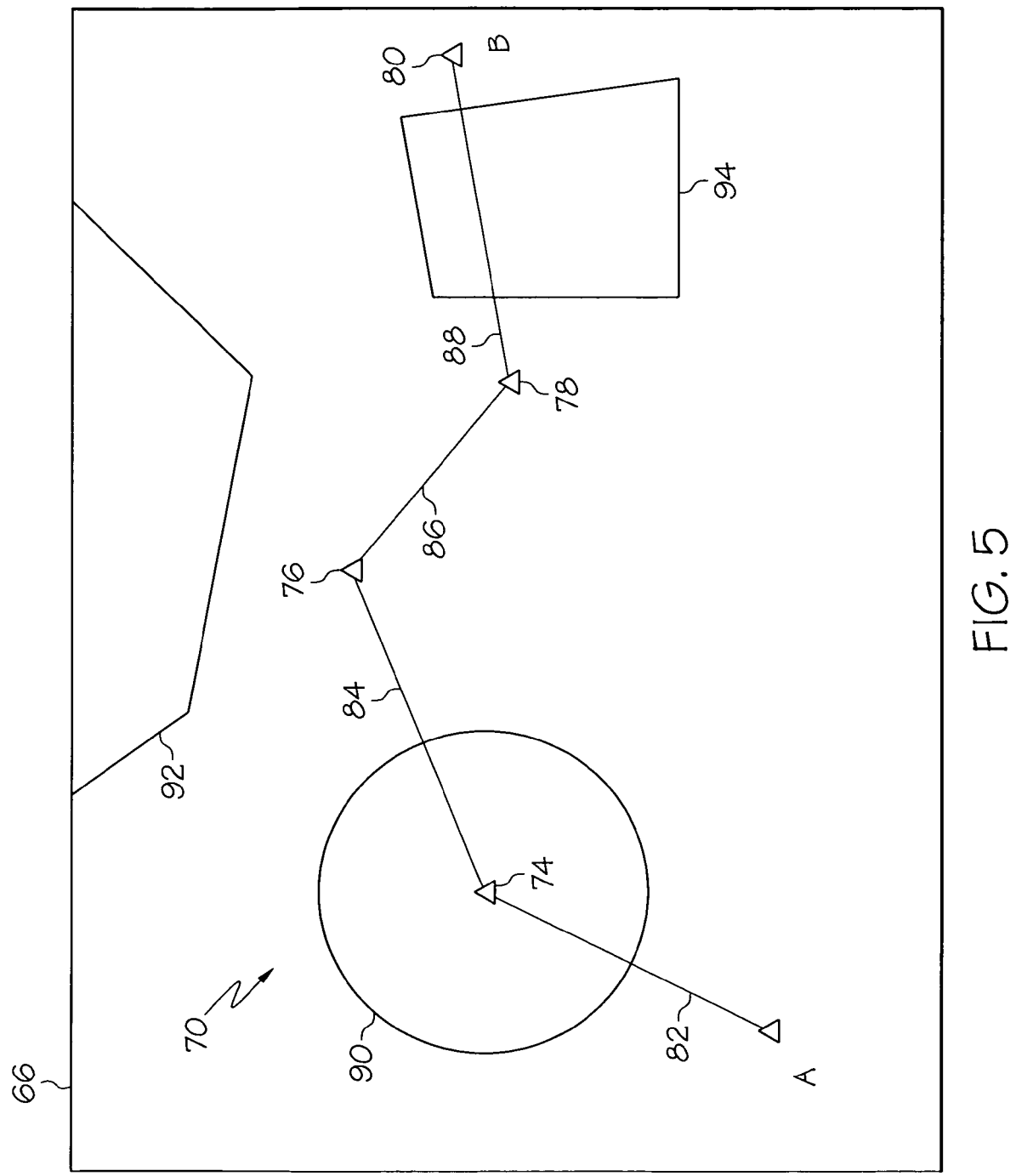
FIG. 5 is a top view of the display screen of FIG. 4 illustrating a comparison of the flight path with nearby airspaces.

As shown in FIG. 5, the FMS 60 and/or the processor 58 compares the flight path 70 to the restricted use airspaces stored in the airspace database 54, and in the depicted embodiment, displays the restricted use airspaces near the flight path 70 on the multi-function display 66. In the embodiment shown, three airspaces 90, 92, and 94 are displayed on the display 66 with airspaces 90 and 94 being intersected by the flight path 70. Airspace 90 may have a required altitude (e.g., Class B airspace), and airspace 94 may be a no-fly zone (e.g., MOA).

If airspace 90 is has a required altitude and/or speed, the altitude and speed profiles of the flight path 70 are compared with the location of airspace 90 as well as the required altitude and speed for airspace 90. In one embodiment, an indication or alarm, either visual and/or audible, is then provided to the user via one of the display devices 18 and 20 (e.g., the multi-function display 66) and/or the audio device 26 on the flight deck 12 regardless of whether or not the altitude profile of the flight path 70 meets the requirements of airspace 90. That is, in one mode of operation the user 28 may be provided with the indication anytime the flight path 70 intrudes upon any restricted use airspace, regardless of whether or not the current flight path 70 meets the requirements of that airspace.

Alternatively, the indication may be provided to the user 28 only if the flight path 70 does not meet the specific requirements of airspace 90. That is, the indication may be provided only if the altitude and speed profiles of the flight path 70 fail to meet the altitude/speed requirements of airspace 90. In the example shown in FIG. 6, the indication is given to the user 28 by flashing or blinking the portions of the flight path 70 (approximately half of segments 82 and 84) that intersect airspace 90.

Figure 6:
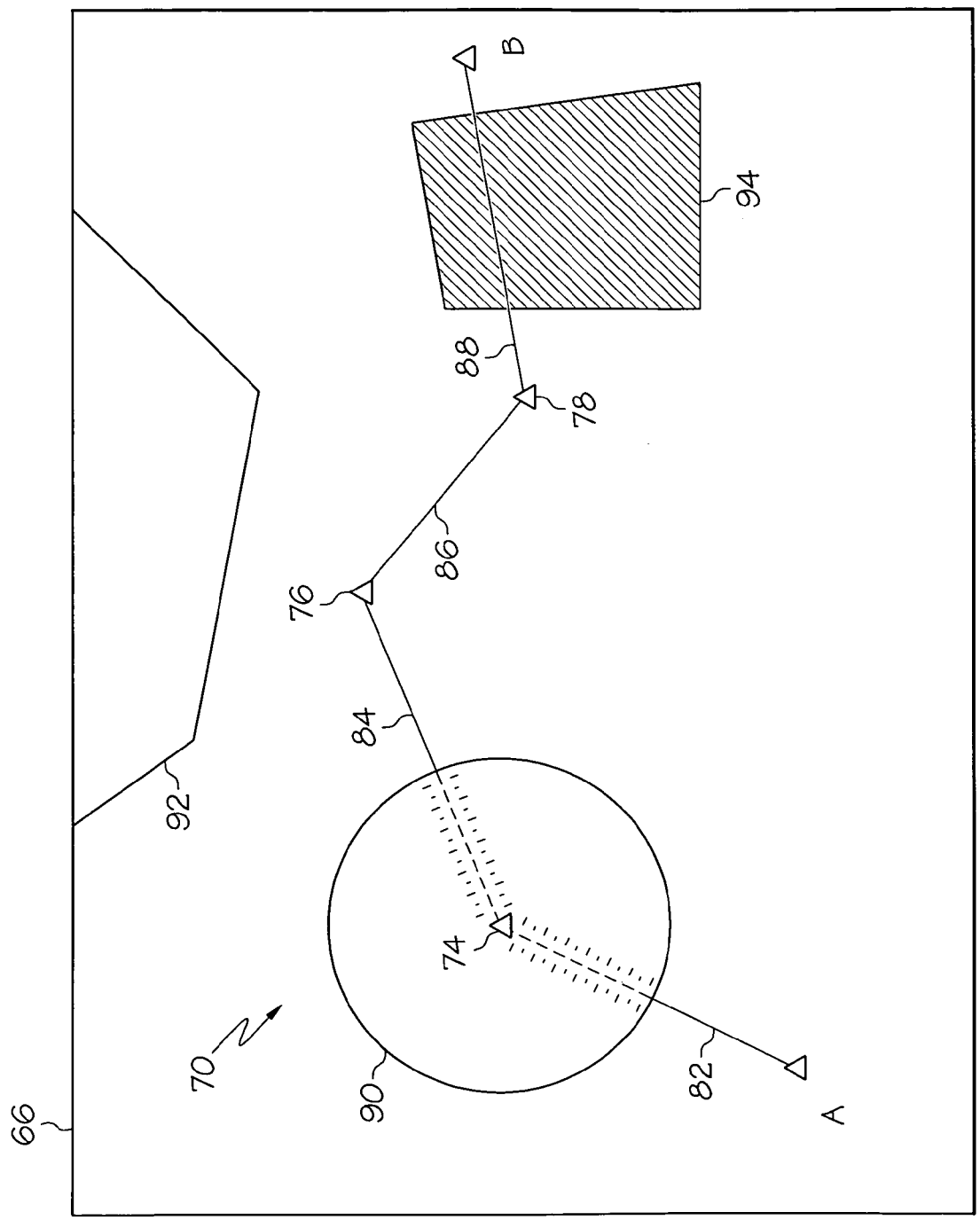
FIG. 6 is a top view of the display screen of FIG. 5 illustrating various indications of intrusions of the flight path into the restricted airspaces.

Still referring to FIG. 6, in the example in which airspace 94 is a no-fly zone and is intersected by the flight path 70, airspace 94 may be colored or highlighted, such as in red, on the display 66. Additionally, because the potential hazard that may be involved in flying an aircraft into a no-fly zone, supplemental indications may also be provided to the user. For example, a text message, such as "NO-FLY ZONE ALERT," may appear on one of the displays 18 and 20 on the flight deck, and an audio indication, or aural warning, may be emanated from the audio device 26 on the flight deck. The audio indication may be a buzzer or tone, or a voice recording.

Figure 7:
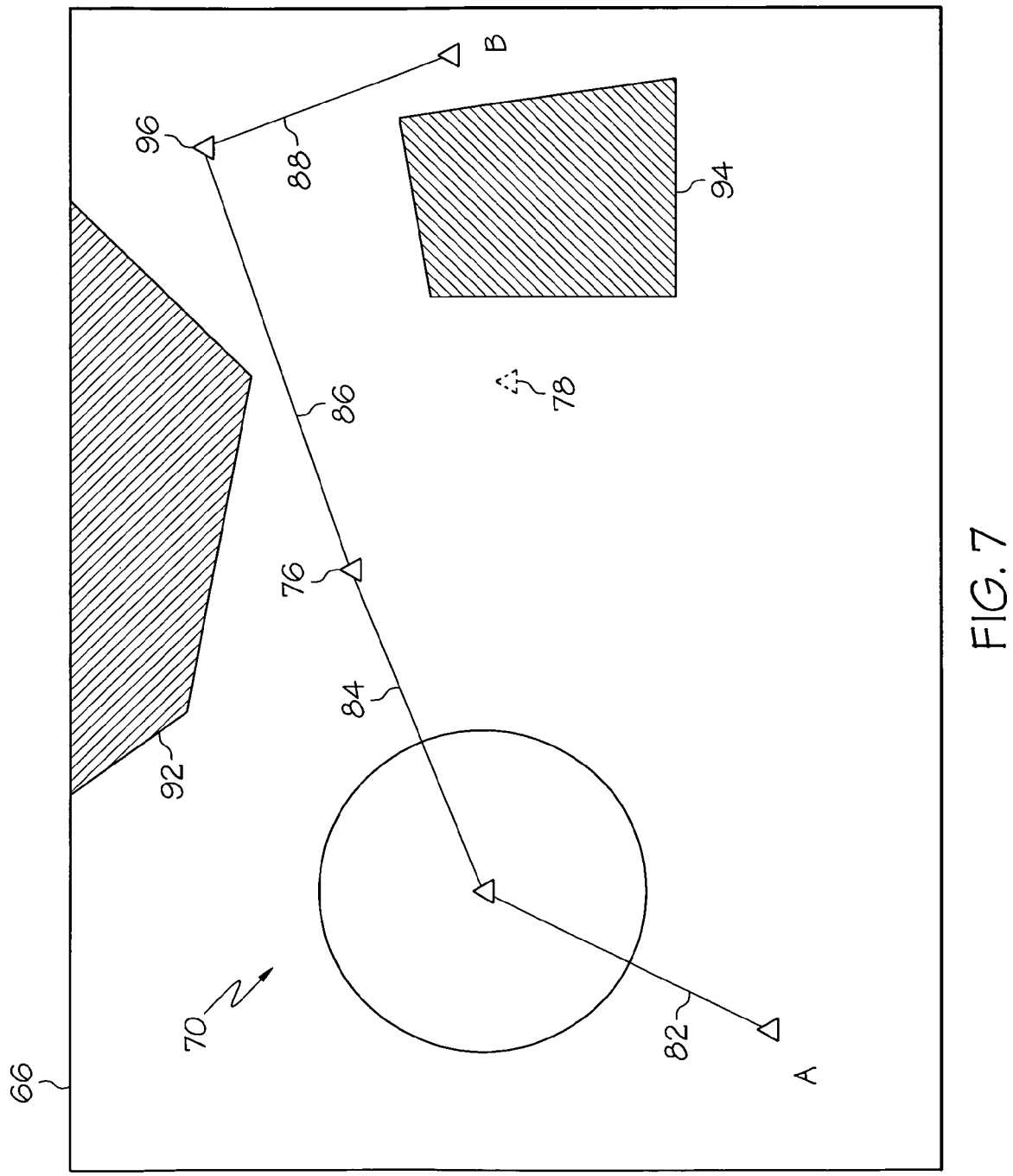
FIG. 7 is a top view of the display screen of FIG. 5 illustrating an alternative flight path which does not intrude into a selected one of the airspaces.

As shown in FIG. 7, the flight path 70 may then be altered, either by the user 28 or automatically by the FMS 60, so that airspace 94 is not intruded upon during flight. In the example shown in FIG. 7, in the altered flight path 70, waypoint 78 has been removed and replaced with a new waypoint 96 such that segment 88 no longer intersects airspace 94.

In one embodiment of the present invention, an indication may be provided to the user 28 if the flight path 70 calls for the vehicle 10 to fly within a predetermined distance of selected types of airspace (e.g., no-fly zones) without actually intruding upon them. Thus, still referring to FIG. 7, if one or both of airspaces 92 and 96 are no-fly zones, and portions segments 86 and 88 come within a pre-selected distance (e.g., 10 miles), an indication is provided to the user 28. As shown in FIG. 7, the indication may include color coding or highlighting the appropriate airspaces 92 and 94 in a color different from that shown in FIG. 6 (in which the flight path 70 actually intersected airspace 94), such as yellow, without the use of an audio indication. However, it should be understood that in one mode of operation, such a warning may not be provided so as to minimize the number of unnecessary warnings given to the user 28.

It should be understood that the process described above and in FIGS. 4-7 may be performed before take-off (i.e., while the vehicle 10 is still on the ground). As such, the user is provided with indications of possible intrusions into airspaces well before the vehicle 10 is flying towards the particular airspace.

Figure 8:
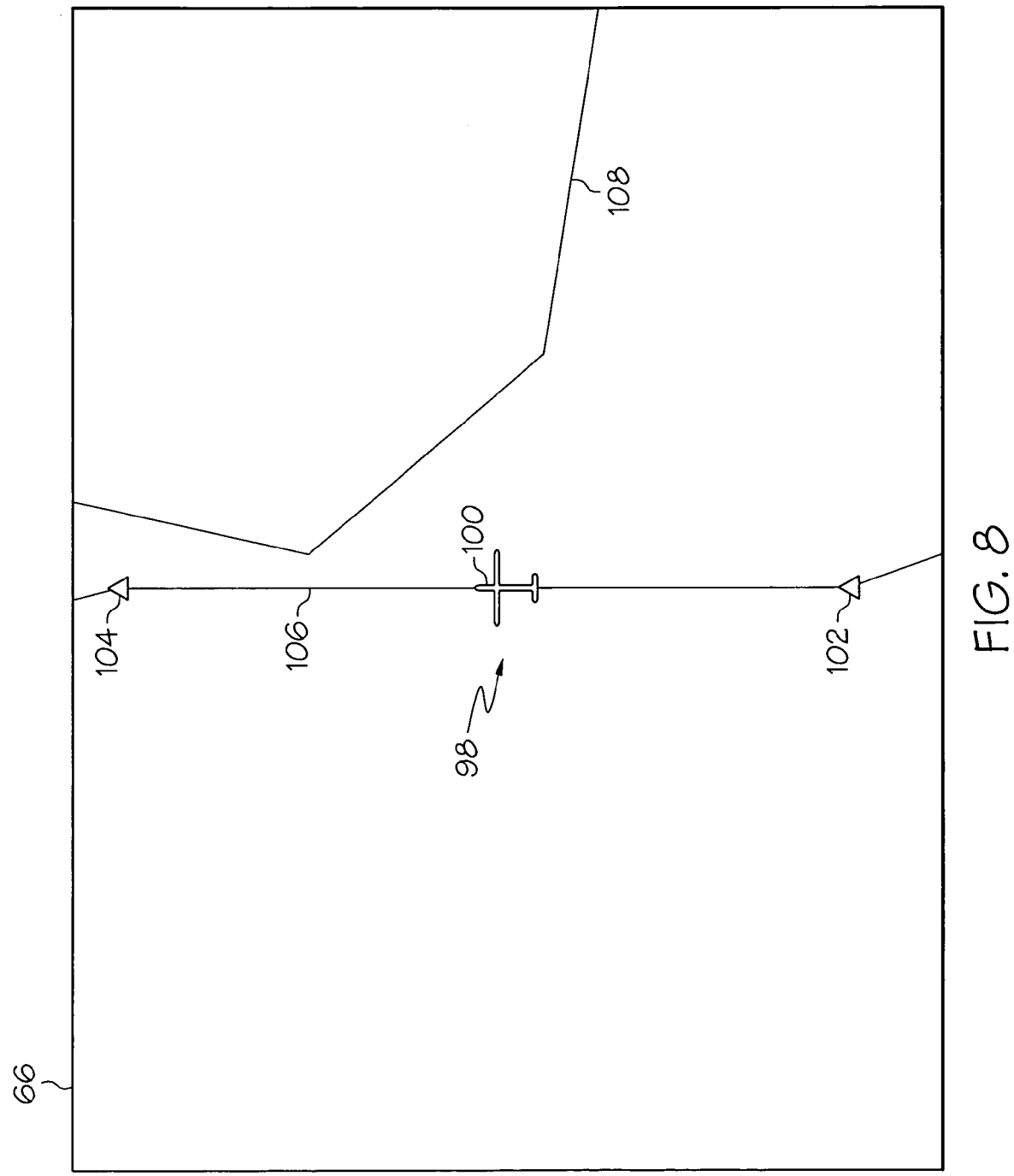
FIGS. 8 and 9 are top views of the display screen of FIG. 3 with a flight path and an airspace displayed thereon while the aircraft is in flight.
Figure 9:
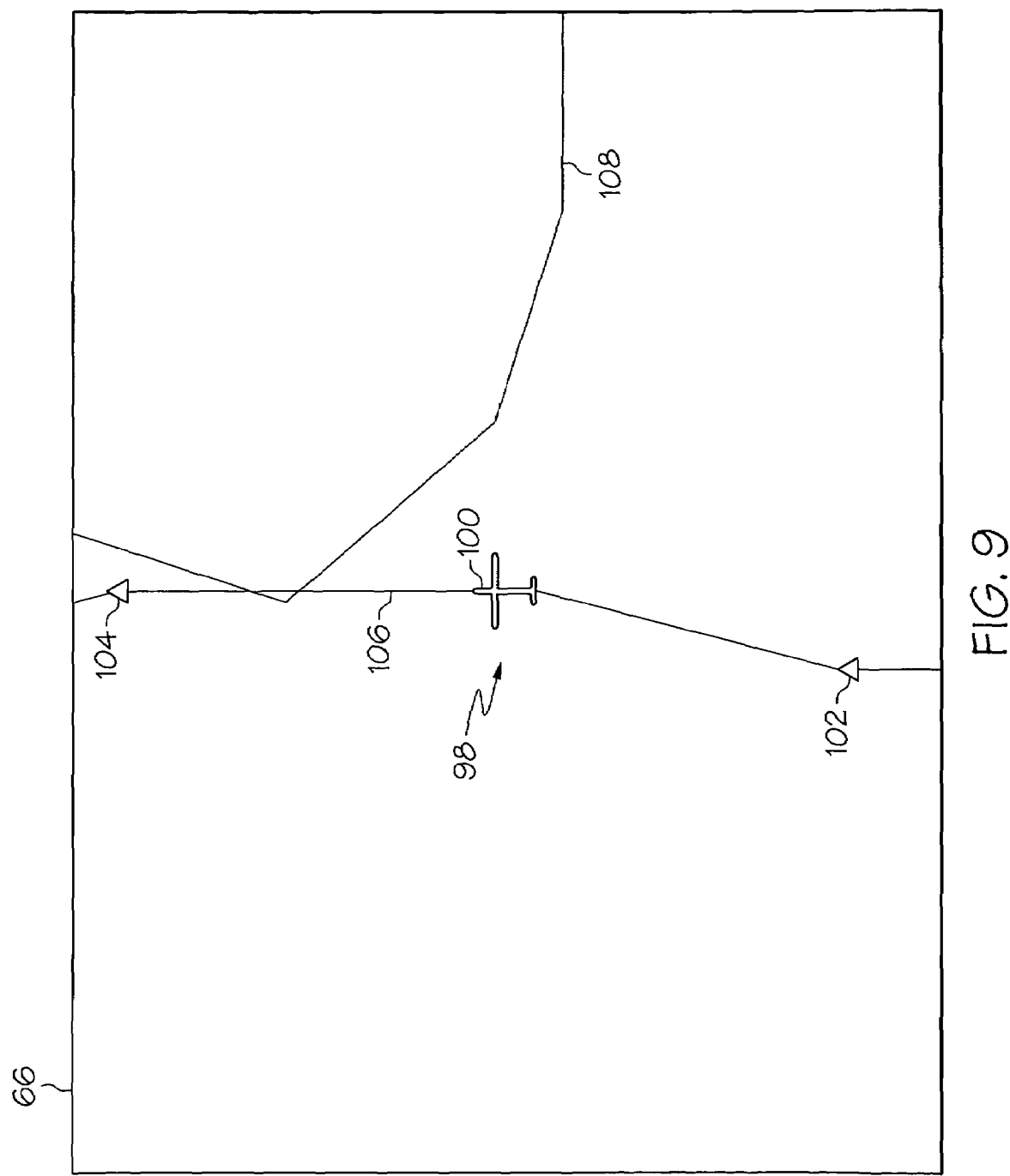

FIGS. 8 and 9 illustrate a portion of a flight path 98 displayed on the multi-function display 66 of the CDU 62 with the FMS 60 and/or the CDU 62 in a "map" mode while the vehicle 10 is in flight. The map mode displays the flight path 98 such that a vehicle symbol 100 is always located at the center of the display 66 with the heading of the vehicle 10 always being towards the top side of the display 66. As shown in FIG. 8, the flight path 98 includes waypoints 102 and 104 and a segment 106 interconnecting the waypoints 102 and 104 and calls for the vehicle 10 to fly near a restricted airspace 108. However, as the vehicle 10 approaches the waypoint 104, due to various factors, such as wind shear and correction of the latitude and longitude of the vehicle by the FMS 60 (e.g., via the GPS 74), the flight path 98 may be altered (e.g., by the FMS 60) as shown in FIG. 9. After the alteration of the flight path 98, the flight path 98 may intersect the restricted airspace 108, or other airspaces that are not shown in FIGS. 8 and 9 (i.e., further "down path"). Thus, the FMS 60 and/or processor 58 may then re-check for any possible intrusions, or near intrusions, into restricted airspaces, as described above, in order to alert the user 28. As such, the present system is dynamic in that it may account for differences between the planned flight path of the vehicle and the actual flight path taken.

One advantage of the system and method described above is that because the flight path, as opposed to position and heading, of the vehicle is compared to the locations of restricted airspaces, warnings of possible intrusions into such areas may be given long before they occur, even while the vehicle is on the ground. Thus, the likelihood that the pilot will have to make corrections to the flight path during flight is reduced, which reduces stress and improves the safety of flying, and may reduce the amount of fuel use on the flight. Another advantage is that the system intermittently updates the various factors involved in determining whether or not the flight path intrudes upon a restricted airspace. As a result, whether or not the flight path intersects a restricted airspace may be dynamically calculated. A further advantage is that, depending on the particular configuration, the system may not provide a warning or indication of an intrusion when the aircraft is on a heading to intersect a restricted airspace but the flight path calls for the aircraft to change headings before the airspace is intruded upon. Thus, the number of unnecessary warnings is minimized.

Other embodiments may vary the types of indications given for the different types of airspaces. For example, audible indications may be provided for all types of airspaces, and the visual indications described above may be utilized with airspace types different than those described above. It should also be understood that such a system may be utilized in vehicles other than aircraft, such as automobiles and watercraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. An avionics system comprising:
    at least one storage device having a flight path of an aircraft and locations of a plurality of selected airspaces stored thereon, wherein the flight path comprises at least one of a latitude and longitude of the aircraft, a heading of the aircraft, and an altitude of the aircraft and the locations of the plurality of selected airspaces comprise for each selected airspace at least one of a latitude and longitude and an altitude, the at least one storage device comprises a Flight Management System (FMS), and the plurality of selected airspaces comprise at least one of an airspace defined by a user and an airspace defined by an aviation regulatory authority; and
    a processor in operable communication with the at least one storage device, the processor being configured to:
        compare the flight path of the aircraft to the locations of the plurality of selected airspaces; and
        provide an alert signal if the flight path calls for the aircraft to enter at least one of the plurality of selected airspaces;
    wherein said providing of the alert signal occurs when a current heading of the aircraft does not intersect a nearest one of the plurality of selected airspaces.

2. The system of claim 1, wherein said providing of the alert signal occurs when the aircraft is not in flight.

3. The system of claim 2, wherein at least some of the plurality of selected airspaces are at least one of a Flight Information Region (FIR), an Upper Flight Information Region (UIR), and a Military Operating Area (MOA).

4. The system of claim 3, further comprising a visual display device in operable communication with the processor to receive the alert signal and generate a visual indication of the alert signal, the visual indication comprising at least one of a color-coded message and a text message.

5. The system of claim 4, further comprising an audio device in operable communication with the processor to receive the alert signal and generate an audio indication of the alert signal.

6. An avionics system comprising:
    a Flight Management System (FMS) having a flight path of an aircraft stored thereon;

a computer-readable medium in operable communication with the FMS having locations of a plurality of selected airspaces stored thereon;

a processor in operable communication with the FMS and the computer-readable medium, the processor being configured to:
  compare the flight path of the aircraft to the locations of the plurality of selected airspaces; and
  provide an alert signal if the flight path calls for the aircraft enter at least one of the plurality of selected airspaces,
  wherein said providing of the alert signal occurs when at least one of a current heading of the aircraft does not intersect a nearest one of the plurality of selected airspaces and the aircraft is not in flight; and at least one of a visual display device in operable communication with the processor to receive the alert signal and generate a visual indication of the alert signal and an audio device in operable communication with the processor to receive the alert signal and generate an audio indication of the alert signal.

7. The system of claim 6, wherein the at least one of a visual display device and an audio device comprises the visual display device and wherein the visual indication comprises at least one of a color-coded message and a text message.

8. The system of claim 7, wherein the visual display device is connected to the FMS.

9. The system of claim 8, wherein at least some of the plurality of selected airspaces are at least one of a Flight Information Region (FIR), an Upper Flight Information Region (UIR), and a Military Operating Area (MOA).

10. A method for alerting a user of an aircraft of a possible entrance into a selected airspace comprising:
  loading a flight path onto a Flight Management System (FMS) onboard the aircraft, wherein the flight path comprises at least one of latitude and longitude of the aircraft, a heading of the aircraft, and an altitude of the aircraft;
  comparing the flight path to locations of a plurality of selected airspaces stored on a computer-readable medium in operable communication with the FMS, wherein the locations of the plurality of selected airspaces comprises at least one of the latitude and longitude of the selected airspaces and an altitude of the selected airspaces; and
  alerting the user of the aircraft if the flight path calls for the aircraft to intersect one or more of the plurality of selected airspaces,
  wherein said alerting of the user occurs when at least one of a current heading of the aircraft does not intersect a nearest one of the plurality of selected airspaces and the aircraft is not in flight.

11. The method of claim 10, wherein the plurality of airspaces comprises at least one of an airspace defined by the user and an airspace defined by an aviation regulatory authority.

12. The method of claim 11, wherein said alerting of the user comprises providing at least one of a visual indication and an audio indication to the user of the aircraft.

* * * * *